2,989,568
PREPARATION OF HALOGENATED ACETYLENIC ALCOHOLS

James P. Russell, North Bergen, and James F. Vitcha, New Providence, N.J., assignors to Air Reduction Company, Incorporated, New York, N.Y., a corporation of New York No Drawing. Filed Dec. 31, 1958, Ser. No. 784,091
4 Claims. (Cl. 260—633)

This invention relates to the preparation of halogenated acetylenic alcohols and is more particularly concerned with the preparation of halogenated acetylenic alcohols of the formula

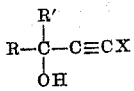

wherein X is chlorine or bromine and R and R' are hydrogen, a lower alkyl radical, i.e. an alkyl radical containing 1 to 5 carbon atoms, an alicyclic radical, such as cyclohexyl, or the phenyl radical, with R and R' being selected in such manner that the sum of the carbon atoms of R and R' is at most seven.

Attempts have been made to prepare halogenated acetylenic alcohols of the type indicated by the above formula by reacting the corresponding acetylenic alcohol with the appropriate alkali metal hypohalite, e.g. sodium hypochlorite. Extreme difficulty has been encountered, however, by reason of the fact that when the prior art processes have been followed, highly explosive intermediates or by-products are produced which render the operation extremely hazardous and delicate. This problem is particularly acute in connection with the preparation of chlorinated acetylenic alcohols such as 1-chloro-3-methyl-1-butyn-3-ol. Attempts have been made to avoid these hazards by using very low temperatures but such attempts have been generally uneconomical and have required excessive reaction times.

It is an object of this invention to provide an improved process for preparing halogenated acetylenic alcohols, particularly the chlorinated acetylenic alcohols, which avoids the explosion hazard heretofore encountered.

It is a further object of the invention to provide a process of the character indicated which makes possible the smooth, efficient and safe production of halogenated acetylenic alcohols of high purity.

In accordance with the invention, halogenated acetylenic alcohols are directly prepared from the corresponding acetylenic alcohol by treating an acetylenic alcohol of the formula

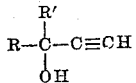

wherein R and R' have the meanings given above, with an alkali metal hypohalite at atmospheric pressure in the presence of a lower alkyl ether, i.e. an alkyl ether having an alkyl group of 1 to 7 carbon atoms.

It is a feature of the invention that the presence of the lower alkyl ether effectively eliminates the explosion hazard even in the case of the preparation of chlorinated acetylenic alcohols.

It is another feature of the invention that halogenated acetylenic alcohols of high purity are directly produced.

Other objects and features of the invention will become apparent as the description thereof proceeds.

The lower alkyl ethers which are employed, in accordance with the invention, are characterized by the formula R"—O—R'" wherein R" and R'" are the same or different alkyl groups containing 1 to 5 carbon atoms, inclusive, and have a boiling point at atmospheric pressure above 35° C. Examples of alkyl ethers suitable for use in accordance with this invention are di-ethyl ether, diisopropyl ether, ethyl isopropyl ether, di-n-butyl ether, methyl-n-butyl ether, di-amyl ether, ethyl-amyl ether, and butyl-amyl ether.

The alkali metal hypohalite which is employed corresponds to the halogen to be introduced into the acetylenic alcohol. In preparing a chloro-acetylenic alcohol, for example, sodium hypochlorite or potassium hypochlorite are advantageously employed and in preparing bromo-acetylenic alcohols, the corresponding bromo alkali metal hypohalites, e.g. sodium hypobromite and potassium hypobromite are utilized. The alkali metal hypohalite is suitably employed in aqueous solution and solutions of a concentration of 8 to 15% are particularly effective. Advantageously, the alkali metal hypohalite is prepared in situ in the reaction vessel before the ether and the acetylenic alcohol are introduced. Thus, in a typical operation, an alkali metal hydroxide, e.g. sodium hydroxide or potassium hydroxide, is dissolved in sufficient water to provide the concentration of alkali metal hypohalite indicated above and the halogen, i.e. chlorine or bromine, is then gradually introduced into the aqueous alkaline solution substantially at room temperature or slightly above, until the desired concentration of hypohalite has been formed. For example, cooling of the reaction mixture is effected in order to keep the temperature from exceeding about 36° C. For best results, a ratio of alkali metal hydroxide to hypohalite of 1.5-1.7 to 1 is desirable although a lower or higher amount of alkali metal hydroxide may be used and the ratio of alkali metal hydroxide to hypohalite may vary, for example, from 0.25:1 to 5:1.

As previously indicated, the acetylenic alcohols used to prepare halogenated alcohols in accordance with this invention have the formula

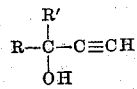

Examples of such acetylenic alcohols are 3-methyl-1-butyn-3-ol, 1-pentyn-3-ol, 3-methyl-1-pentyn-3-ol, 4-methyl-1-pentyn-3-ol, 1-hexyn-3-ol, 3,5-dimethyl-1-hexyn-3-ol, ethynyl cyclohexanol, and 3-phenyl-1-butyn-3-ol. In the foregoing acetylenic alcohols it will be seen that the sum of the carbon atoms in R and R' is at most nine.

The amount of lower alkyl ether employed may vary but for best results at least 0.6 mol of alkyl ether per mol of acetylenic alcohol is employed and while in excess of one mol of alkyl ether per mol of acetylenic alcohol may be used, there is no particular advantage in doing so. Without added lower alkyl ether, however, explosive by-products tend to be formed, rendering the operation hazardous and unsafe.

The quantity of alkali metal hypohalite may vary, but generally speaking the alkali metal hypohalite should be in 5 to 20% excess over the stoichiometric quantity required for the quantity of acetylenic alcohol employed. Greater excesses may be used but no particular advantage is gained in so doing.

After the alkali metal hypohalite has been prepared in the reaction vessel, or if it is separately prepared, after it has been charged to the vessel, flow of alkyl ether and acetylenic alcohol is begun. The ether and acetylenic alcohol is advantageously mixed and added dropwise at a rate such that a temperature of about 40° C. can be readily maintained.

The reaction may be carried out at a temperature as low as 30° C. but it has been found that somewhat more elevated temperatures are advantageous and preferably a temperature of 35 to 45° C. is employed. Temperatures in excess of 50° C. tend to cause decomposition of the hypohalite, causing foaming and loss of solution and, accordingly, 50° C. should not be exceeded and preferably the maximum temperature should be maintained not substantially above 40° C. Reaction is continued until 95–100% of the stoichiometric amount of hypohalite has been consumed. Generally speaking, the reaction period increases with increasing molecular weight of the acetylenic alcohol. For example, 3-methyl-1-butyn-3-ol, 1-pentyn-3-ol, 4-methyl-1-pentyn-3-ol, 3-methyl-1-pentyn-3-ol and 1-hexyn-3-ol react to form the corresponding 1-chloro compound in about 2 to 2.5 hours whereas 3,5-dimethyl-1-hexyn-3-ol requires a longer reaction time. The bromo acetylenic alcohols are formed more rapidly and reaction times of ½ hour or less are generally sufficient. To facilitate reaction, the reaction mixture is continuously stirred. The reaction vessel is suitably provided with a cooling jacket, a reflux condenser, and inlets for a stirrer, a thermometer and the reactants. At the end of the reaction period, the contents of the reaction zone separate into an aqueous layer and an organic layer, and the organic layer, which contains the halogenated acetylenic alcohol product, is removed. The organic layer is then neutralized, as with carbon dioxide, and filtered, and the filtrate distilled to remove the alkyl ether. The organic residual product is then fractionally distilled to recover the product halogenated acetylenic alcohol.

The invention will be more clearly understood from the following specific examples which are given for illustrative purposes only and are not intended to be limitative of the invention.

EXAMPLE I

*Preparation of 1-chloro-3-methyl-1-butyn-3-ol*

In a five-liter, 4-necked flask provided with two gas inlets, a reflux condenser, a dropping funnel, a thermometer, a stirrer, a gas outlet, a bubble counter, and a cooling bath there were successively charged in the manner described below the following:

NaOH (99%), 450 gms. (11 moles)
$H_2O$ (distilled), 1350 gms. (75 moles)
Chlorine (anhydrous), 235 gms. (3.3 moles)
3-methyl-1-butyn-3-ol, 252 gms. (3 moles)
Ethyl ether, 150 cc. (1.62 moles)

The flask was first charged with water and flushed with nitrogen and the NaOH was then dissolved in the water. The alkaline solution was cooled to 25° C. Chlorine was passed in with cooling and stirring, at a rate to control the temperature at 33°±3°. When all of the $Cl_2$ had been added, the rate of stirring was increased and the mixture of ether and 3-methyl-1-butyn-3-ol added dropwise, at a rate which kept the temperature at 38–40° C. with moderate cooling (1.5 hours addition time). After the addition was complete, the cooling was discontinued and used only if the temperature exceeded 40° C. The temperature fell normally to 35° C. within two hours after the addition was complete. At this point stirring was stopped and the reaction mixture worked up as follows. The organic and aqueous layers which formed were separated and the organic layer carbonated with $CO_2$, filtered through a ¼ inch deep Filter-Cel bed, and the ether flashed off by heating to a temperature of 100° C. The residual organic oil was fractionally distilled through a 25-plate column at 50 mm. 1-chloro-3-methyl-1-butyn-3-ol, B.P. 70°/50 mm., $n_D^{20}$ 1.4567, of 99.1% purity was obtained in 98% yield.

EXAMPLE II

*Preparation of 1-chloro-3-methyl-1-pentyn-3-ol*

When 3-methyl-1-pentyn-3-ol was substituted for the 3-methyl-1-butyn-3-ol of Example I and the procedure of Example I was carried out, there was obtained 1-chloro-3-methyl-1-pentyn-3-ol B.P 77°/35 mm., $n_D^{20}$ 1.4615, of 99.3% purity and in a yield of 94.5%.

EXAMPLE III

*Preparation of 1-bromo-3-methyl-1-pentyn-3-ol*

In a five-liter, 4-necked flask provided with two gas inlets, a reflux condenser, a dropping funnel, a thermometer, a stirrer, a gas outlet, a bubble counter, and a cooling bath there were successively charged in the manner described below the following:

NaOH (99%), 450 gms. (11 moles)
$H_2O$ (distilled), 1350 gms. (75 moles)
Bromine (anhydrous), 480 gms. (3 moles)
3-methyl-1-pentyn-3-ol, 294 gms. (3 moles)
Ethyl ether, 150 cc. (1.62 moles)

The flask was first charged with water and flushed with nitrogen and the NaOH was then dissolved in the water. The alkaline solution was cooled to 25° C. Bromine was added with cooling and stirring, at a rate to control the temperature at 33°±3°. When all of the $Br_2$ had been added, the rate of stirring was increased and the mixture of ether and 3-methyl-1-pentyn-3-ol added dropwise, at a rate which kept the temperature at 38–40° C. with moderate cooling (10 minutes addition time). After the addition was complete, the cooling was discontinued and used only if the temperature exceeded 40° C. The temperature fell normally to 35° C. within 20 minutes after the addition was complete. At this point stirring was stopped and the reaction mixture worked up as follows.

The organic and aqueous layers which formed were separated and the organic layer carbonated with $CO_2$, filtered through a ¼ inch deep Filter-Cel bed, and the ether flashed off by heating to a temperature of 100° C. The residual organic oil was fractionally distilled through a 25-plate column at 3 mm. 1-bromo-3-methyl-1-pentyn-3-ol, B.P. 55°/3 mm., $n_D^{20}$ 1.4908, of 100% purity was obtained in 98% yield.

EXAMPLE IV

In similar manner, other 1-chloro- and 1-bromo-acetylenic alcohols are readily prepared using the procedure described in Examples I and III and the following table tabulates the conditions and the results obtained in the preparation of representative compounds.

| Alcohol | Product | Add'n Time, Hrs. | Total Time, Hrs. | Temp., °C. | Percent Yield |
| --- | --- | --- | --- | --- | --- |
| 1-pentyn-3-ol | 1-chloro-1-pentyn-3-ol | .75 | 1.75 | 40–45 | 86 |
| 4-methyl-1-pentyn-3-ol | 1-chloro-4-methyl-1-pentyn-3-ol | 1.0 | 2.0 | 40 | 87.5 |
| 1-ethynyl cyclohexanol-1 | 1-(chloroethynyl) cyclohexan-1-ol | 1.75 | 2.75 | 35 | 100 |
| 3,5-dimethyl-1-hexynol-3 | 1-chloro-3,5-dimethyl-1-hexynol-3 | 0.25 | 13.25 | 30 | 99 |
| 3-phenyl-1-butyn-3-ol | 1-chloro-3-phenyl-1-butyn-3-ol | 0.25 | 4.25 | 35 | 93 |
| 3-methyl-1-pentyn-3-ol | 1-bromo-3-methyl-1-pentyn-3-ol | 0.12 | 0.3 | 35 | 94 |

The purity of the above products was generally 98 to 100% and the physical characteristics of the products are tabulated below.

| Product | B.P., °C./mm. | M.P., °C. | $n_D^{20}$ |
|---|---|---|---|
| 1-chloro-1-pentyn-3-ol | 87/50 | | 1.4650 |
| 1-chloro-4-methyl-1-pentyn-3-ol | 85/35 | | 1.4634 |
| 1-(chloroethynyl) cyclohexan-1-ol | 59/0.5 | 53 | |
| 1-chloro-3,5-dimethyl-1-hexynol-3 | 116/100 | | 1.4596 |
| 1-chloro-3-phenyl-1-butyn-3-ol | 115/10 | 38–45 | |
| 1-bromo-3-methyl-1-pentyn-3-ol | 55/3 | | 1.4908 |

The compounds prepared by the above-described process are useful as corrosion stabilizers for chlorinated solvents such as trichloroethylene and as inhibitors in plating baths and for these purposes are suitably used in concentrations of about 1%.

It will be understood that various changes and modifications may be made in the process of this invention without departing from the scope of the invention as defined in the appended claims and it is intended, therefore, that all matter contained in the foregoing description shall be interpreted as illustrative only and not as limitative of the invention.

What we claim and desire to secure by Letters Patent is:

1. A process for the preparation of acetylnic alcohols of the formula

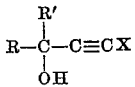

wherein X is selected from the group consisting of chlorine and bromine and R and R' are selected from the group consisting of hydrogen, a lower alkyl radical, and the phenyl radical which comprises treating an acetylenic alcohol of the formula

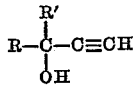

with an alkali metal hypohalite selected from the group consisting of alkali metal hypochlorite and alkali metal hypobromite in the presence of an alkyl ether having an alkyl group of 1 to 7 carbon atoms at a temperature of 30° to 50° C.

2. A process for the production of acetylenic alcohols of the formula

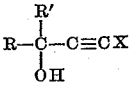

wherein X is selected from the group consisting of chlorine and bromine and R and R' are selected from the group consisting of hydrogen, a lower alkyl radical, and the phenyl radical which comprises treating an acetylenic alcohol of the formula

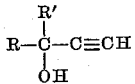

with an alkali metal hypohalite selected from the group consisting of alkali metal hypochlorite and alkali metal hypobromite, said alkali metal hypohalite being present in 5 to 20% excess over the stoichiometric quantity required to react with the acetylenic alcohol in the presence of at least 0.6 mol of an alkyl ether having an alkyl group of 1 to 7 carbon atoms per mol of acetylenic alcohol at a temperature of 30° to 50° C.

3. A process as defined in claim 2, wherein the alcohol is 3-methyl-1-butyn-3-ol.

4. A process as defined in claim 2, wherein the alcohol is 3-methyl-1-pentyn-3-ol.

References Cited in the file of this patent

UNITED STATES PATENTS 1,841,768    Straus et al. _____ Jan. 19, 1932